United States Patent
Frenken

(10) Patent No.: US 11,764,557 B2
(45) Date of Patent: Sep. 19, 2023

(54) BUILDING HAVING A METALLIC, ELECTRICALLY CONDUCTIVE TUBE, ELECTRICAL LINE POSITIONED IN A TUBE OF THIS TYPE AND METALLIC, ELECTRICALLY CONDUCTIVE TUBE FOR THIS PURPOSE

(71) Applicant: GUSTAV KLAUKE GMBH, Remscheid (DE)

(72) Inventor: Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 0 days.

(21) Appl. No.: 17/509,467

(22) Filed: Oct. 25, 2021

(65) Prior Publication Data

US 2022/0045494 A1  Feb. 10, 2022

Related U.S. Application Data

(62) Division of application No. 16/635,779, filed as application No. PCT/EP2018/070685 on Jul. 31, 2018, now Pat. No. 11,183,822.

(30) Foreign Application Priority Data

Aug. 1, 2017  (DE) .................... 10 2017 117 369.2

(51) Int. Cl.
*H02G 3/06* (2006.01)
*H02G 3/22* (2006.01)
*H02G 3/04* (2006.01)

(52) U.S. Cl.
CPC ............. *H02G 3/0481* (2013.01); *H02G 3/06* (2013.01); *H02G 3/22* (2013.01)

(58) Field of Classification Search
CPC .......... H02G 3/0481; H02G 3/06; H02G 3/22
(Continued)

(56) References Cited

U.S. PATENT DOCUMENTS 2,100,796 A * 11/1937 Church ............... H02G 3/0616
285/341
2,184,376 A * 12/1939 Beyer ................. F16L 17/035
277/618
(Continued)

FOREIGN PATENT DOCUMENTS

CN   1156914 A    8/1997
GB   1300719   *  2/1970
(Continued)

OTHER PUBLICATIONS

International Search Report for International Patent Application No. PCT/EP2018/070685 dated Nov. 15, 2018, 4 pages.
(Continued)

*Primary Examiner* — Timothy J Thompson
*Assistant Examiner* — Michael F McAllister
(74) *Attorney, Agent, or Firm* — Klintworth & Rozenblat IP LLP

(57) ABSTRACT

A metal, electrically conductive tube, and electrical lines positioned in the tube for electrically powering a building, is provided. The tube includes tube sections connected by a tubular metal and electrically conductive connection part. The tube sections have end sections facing one another. The connection part extends with its inner surface facing outer surfaces of overlapping sections of the tube sections. The connection of the tube sections is achieved by plastic deformation of the connection part in the overlapping sections. A respective contact is provided between the inner surface and the outer surfaces and ensures the electrically conductive connection between the first end section, the (Continued)

connection part and the second end section via an indentation in the inner surface or the outer surfaces, or via fluidic contact between the outer surfaces and the inner surface.

10 Claims, 10 Drawing Sheets

(58) Field of Classification Search
USPC ........................................................ 174/68.3
See application file for complete search history.

(56) References Cited

U.S. PATENT DOCUMENTS

| | | | | |
|---|---|---|---|---|
| 3,204,988 | A * | 9/1965 | Dunton | F16L 37/0925 |
| | | | | 285/423 |
| 3,477,750 | A * | 11/1969 | Powell | F16L 13/142 |
| | | | | 285/382 |
| 3,563,574 | A | 2/1971 | Jackson et al. | |
| 3,838,205 | A | 9/1974 | Kish | |
| 3,924,877 | A * | 12/1975 | Leopold, Jr. | F16L 37/091 |
| | | | | 285/369 |
| 3,995,897 | A | 12/1976 | Paskert | |
| 4,277,091 | A | 7/1981 | Hunter | |
| 6,224,114 | B1 * | 5/2001 | Franzen | F16L 13/142 |
| | | | | 285/104 |
| 6,262,369 | B1 | 7/2001 | Marik et al. | |
| 6,427,309 | B1 * | 8/2002 | Viegener | F16L 13/142 |
| | | | | 285/379 |
| 6,663,145 | B1 * | 12/2003 | Lyall, III | F16L 37/091 |
| | | | | 285/104 |
| 6,988,746 | B2 * | 1/2006 | Olson | F16L 19/12 |
| | | | | 285/353 |
| 7,201,382 | B2 * | 4/2007 | Viegener | F16L 37/0845 |
| | | | | 277/611 |
| 7,563,100 | B1 | 7/2009 | Smith | |
| 8,056,473 | B2 | 11/2011 | Frenken | |
| 8,511,690 | B2 | 8/2013 | Holmes, IV et al. | |
| 8,533,926 | B2 | 9/2013 | Holmes, IV et al. | |
| 8,585,100 | B2 * | 11/2013 | Stults | F16L 13/142 |
| | | | | 29/508 |
| 9,321,096 | B2 * | 4/2016 | Agarwal | B21D 51/16 |
| 10,001,230 | B2 * | 6/2018 | Rischen | B21C 37/28 |
| 10,036,495 | B2 * | 7/2018 | Stout | F16L 21/022 |
| 10,240,698 | B2 * | 3/2019 | Lawrence | F16L 13/142 |
| 10,330,203 | B2 * | 6/2019 | Dietle | F16J 15/3268 |
| 10,823,316 | B2 * | 11/2020 | Lawrence | F16L 13/142 |
| 2004/0070207 | A1 | 4/2004 | Olson | |
| 2008/0078880 | A1 | 4/2008 | Petit | |
| 2008/0157524 | A1 * | 7/2008 | Jones | F16L 37/0925 |
| | | | | 29/525 |
| 2011/0204624 | A1 * | 8/2011 | Lawrence | F16L 13/142 |
| | | | | 285/345 |
| 2013/0004232 | A1 | 1/2013 | Smith | |
| 2013/0119655 | A1 * | 5/2013 | Jamison | F16L 37/091 |
| | | | | 285/295.1 |
| 2014/0197633 | A1 * | 7/2014 | Nixon | F16L 13/142 |
| | | | | 29/516 |
| 2017/0328498 | A1 * | 11/2017 | Salehi-Bakhtiari | F16L 13/146 |

FOREIGN PATENT DOCUMENTS

| | | | |
|---|---|---|---|
| GB | 2349751 | * | 8/2000 |
| GB | 2349751 A | | 11/2000 |
| WO | 2008/13987 A2 | | 1/2008 |

OTHER PUBLICATIONS

Written Opinion or International Patent Application No. PCT/EP2018/070685 dated Nov. 8, 2018, 6 pages.
International Preliminary Examination Report for International Patent Application No. PCT/EP2018/070685 dated Dec. 9, 2019 6 pages.
Machine Translation of CN 1156914.

* cited by examiner

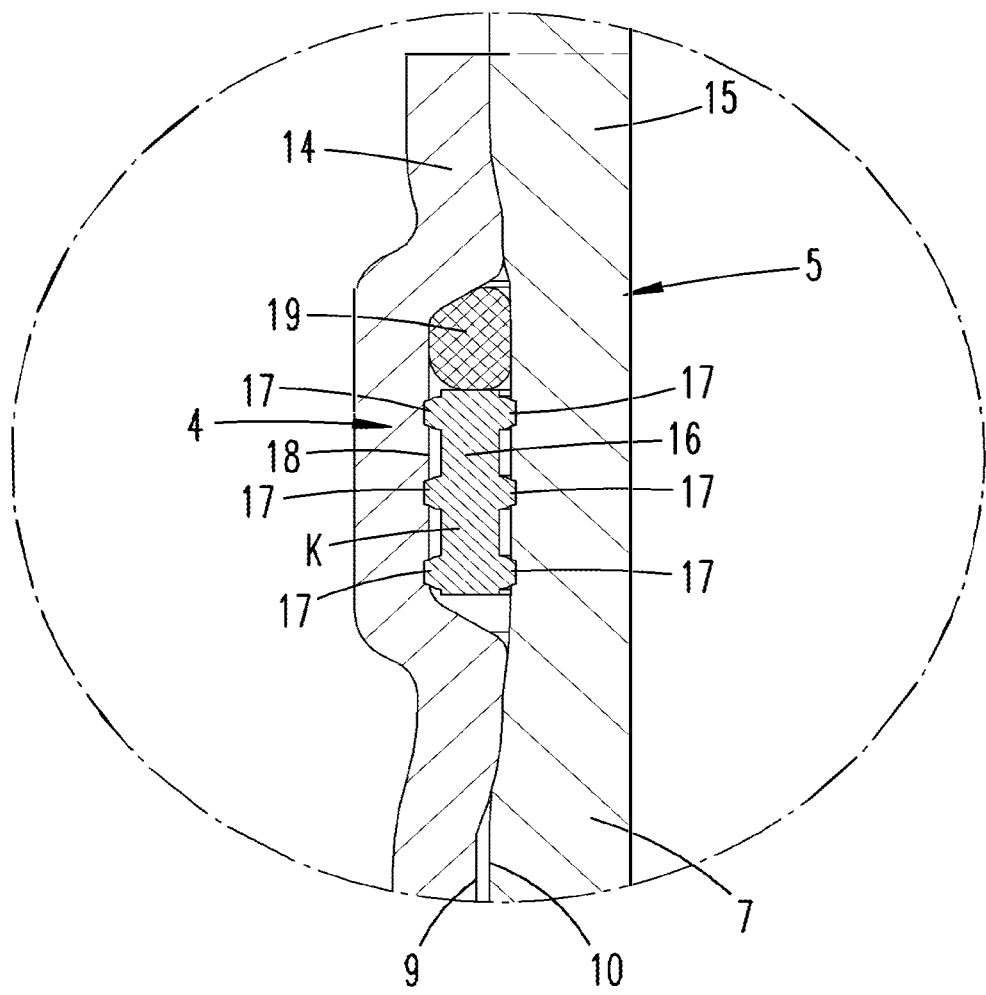

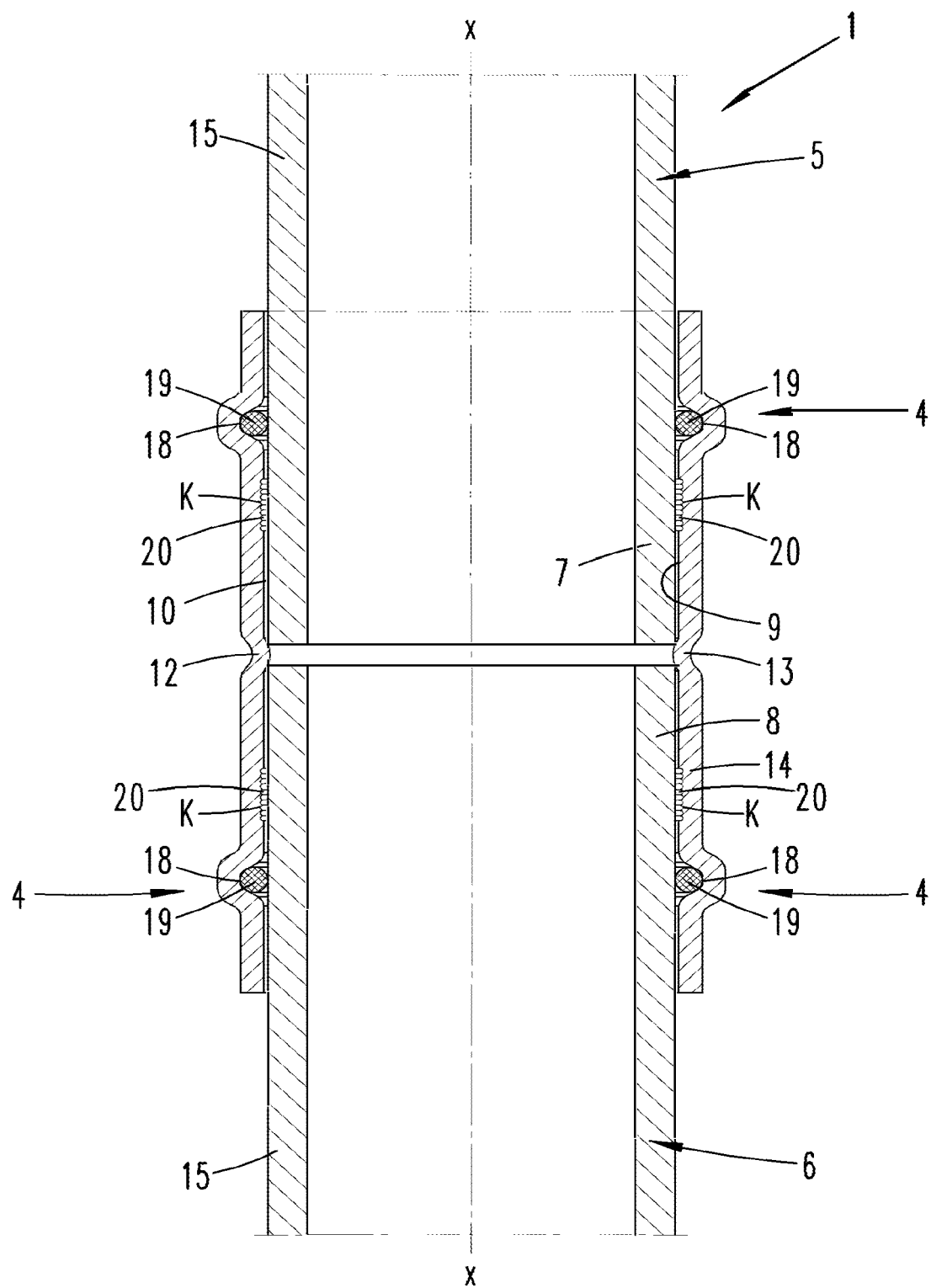

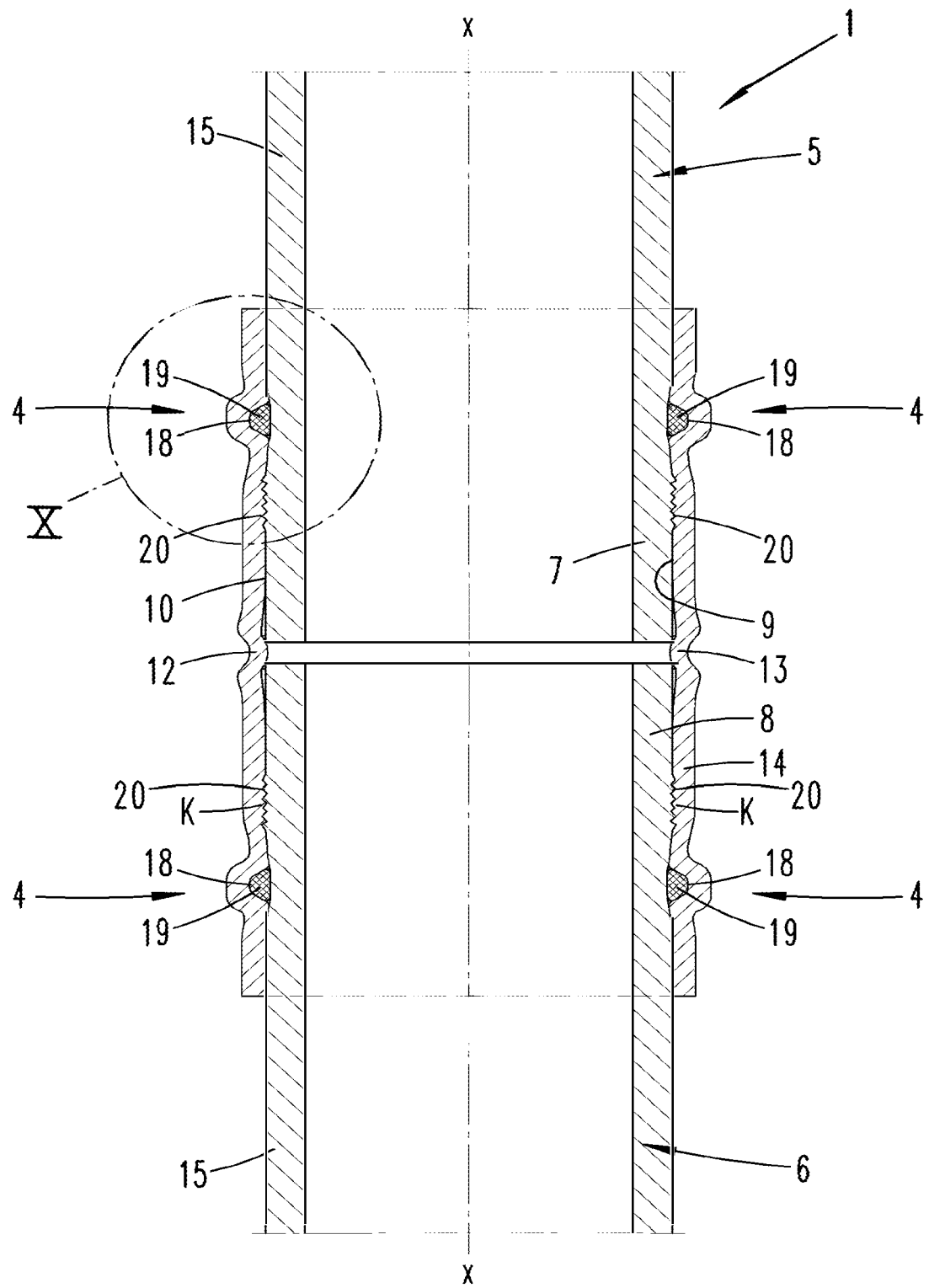

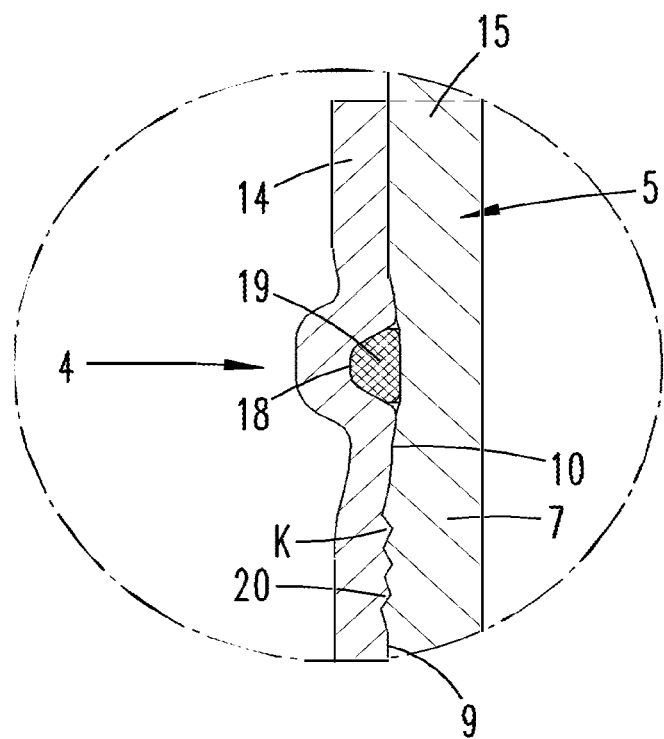

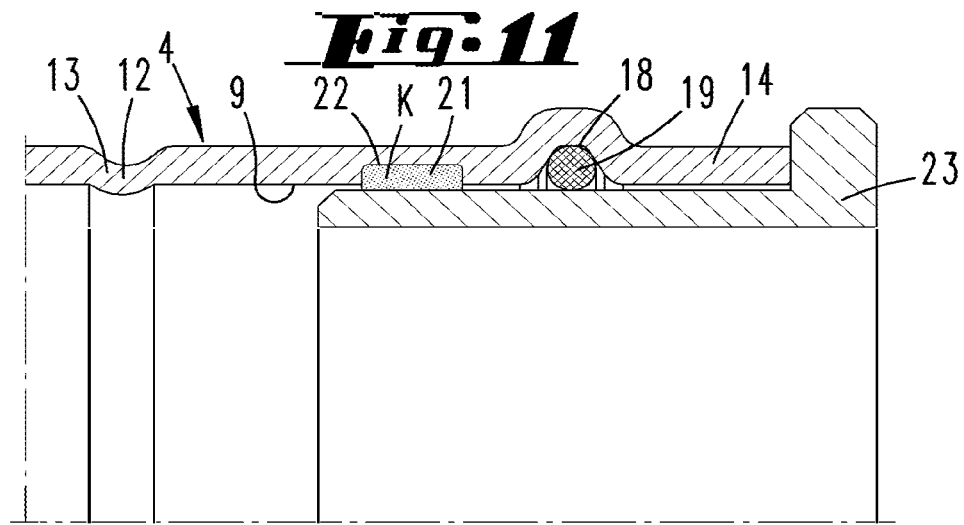
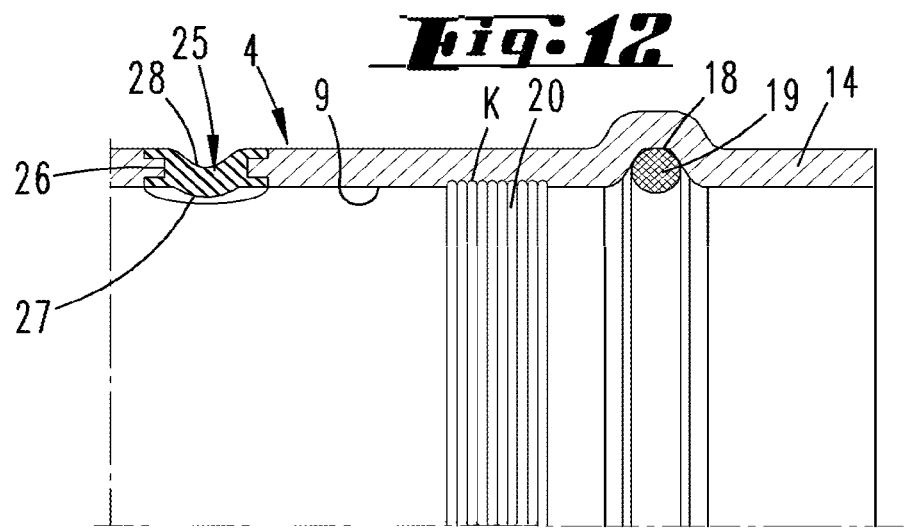
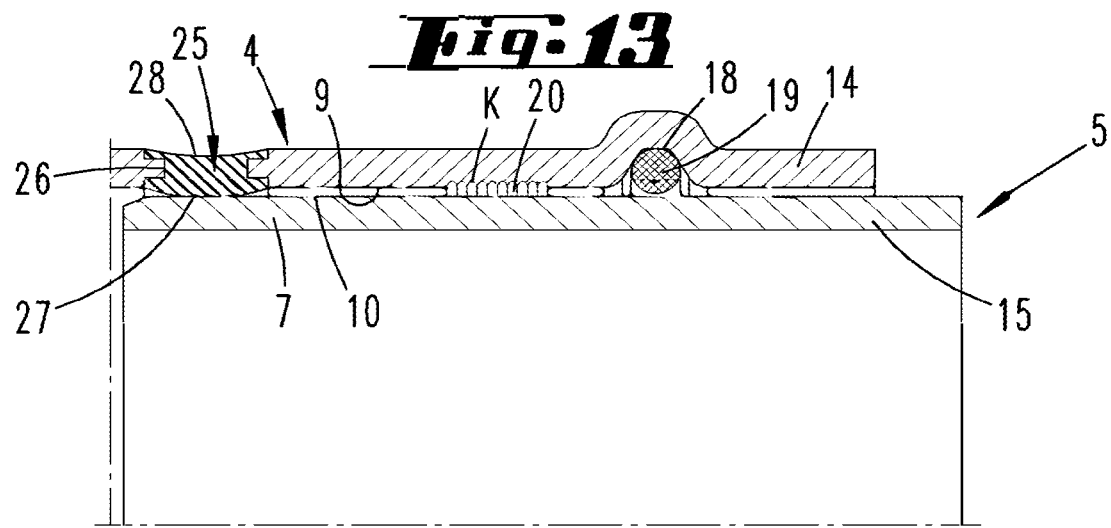

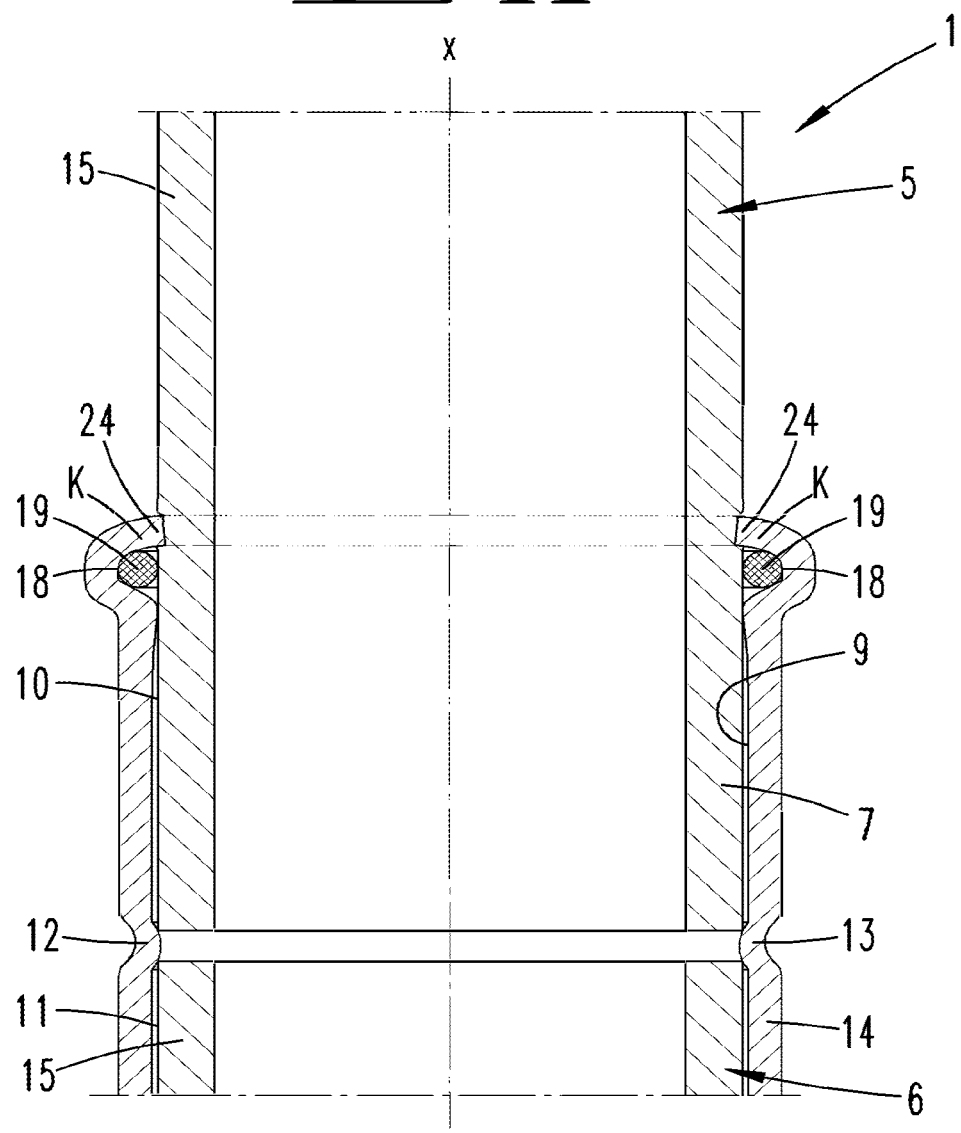

BUILDING HAVING A METALLIC, ELECTRICALLY CONDUCTIVE TUBE, ELECTRICAL LINE POSITIONED IN A TUBE OF THIS TYPE AND METALLIC, ELECTRICALLY CONDUCTIVE TUBE FOR THIS PURPOSE

CROSS-REFERENCE TO RELATED APPLICATION(S)

This application is a divisional application of U.S. application Ser. No. 16/635,779, filed on Jan. 31, 2020, which is a 371 of international PCT/EP2018/070685, filed on Jul. 31, 2018, which claims priority to DE 10 2017 117 369.2, filed on Aug. 1, 2017, the contents of which are incorporated herein in its entirety.

TECHNICAL FIELD

The invention initially pertains to a building with a metallic, electrically conductive tube, wherein electric lines for the electrical power supply of the building are installed in the tube.

The invention also pertains to electric lines that are installed in a metallic, electrically conductive tube and serve for the electrical power supply of a building.

The invention furthermore pertains to a metallic, electrically conductive tube for the installation of electric lines for the electrical power supply of a building in the tube.

PRIOR ART

In buildings such as residential or industrial buildings, particularly buildings with wood construction, it is known to install electric lines in tubes. Metallic, electrically conductive tubes particularly are used for this purpose in order to ensure immediate grounding, e.g., in case of a short circuit. The installation of electric lines in tubes of this type is also important with respect to diminishing a cause of fires. The individual tube sections are metallic and electrically conductive, as well as connected to one another, such that the tube as a whole is electrically conductive. In case of a short circuit, electrical currents can thereby be directly discharged via the tube accommodating the electric lines.

U.S. Pat. No. 7,563,100 B1 discloses a sliding connection between tube sections and a connection part, wherein the sliding part is fixed with respect to the tube sections by fixing screws. U.S. Pat. No. 3,838,205 A discloses a connection between a connection part and associated tube ends, wherein a pressure ring arranged on the radially outer side of the connection part is acted upon with a hydraulic force. In this way, pins provided in the interposed flexible material are also acted upon such that they produce an electrically conductive connection between the respective tube section and the connection part in the compressed state. US 2008/0078880 A1 likewise discloses a sliding connection between a first and a second tube end, wherein the second tube end is realized with a widening in the sense of a connecting sleeve. A flexible, electrically conductive connection part is provided for producing an electrically conductive connection and contains carbon in order to realize the conductivity. Comparable prior art is ultimately also known from CN 1156914 A.

In this context, it is known to use screw connections between the tube sections. As an example, we refer to the prior art according to U.S. Pat. No. 6,262,369 B1.

SUMMARY OF THE INVENTION

In light of the above-described prior art, an objective of the invention can be seen in disclosing a connection design for electric lines installed in a tube of a building, as well as for a tube to be used for this purpose, wherein said connection design is advantageous with respect to the manufacturing technology and improved with respect to the electrically conductive connection of the tube sections.

With respect to the tube, this objective is attained with claim 1, wherein it is proposed that the connection of the tube sections is achieved as a result of a compression and plastic deformation of the connection part in the first and the second overlapping section and of the first and the second tube section in the first end section and in the second end section, in which they adjoin one another directly and in a plastically deformed manner in the compressed state, and that a contact is respectively effective in the first and the second overlapping section between the inner surface and the first and the second outer surface, with the contact ensuring the electrically conductive connection between the first end section and the connection part and between the connection part and the second end section by an indentation in the inner surface or the first and the second outer surface.

This objective is furthermore attained with respect to the building by the object of claim 2 and with respect to a tube with electric lines installed therein by the object of claim 3.

The proposed design makes it possible to advantageously produce a connection between the electrically conductive tube sections in order to create a tube that as a whole is electrically conductive. The connection between the first tube section and a connection part, as well as between the connection part and a second tube section, is also electrically conductive and advantageously produced with respect to the manufacturing technology by plastic deformation in the region of interacting sections of the connection part and the tube sections. The plastic deformation preferably can be achieved as a result of a compression, e.g. a compression carried out by means of a handheld pressing apparatus. As an example, we refer to WO 2008/138987 A1 (U.S. Pat. No. 8,056,473 B2) with respect to such handheld pressing apparatuses.

The plastic deformation not only produces a mechanical connection between the connection part and the two associated tube sections, but at the same time also the required electrically conductive connection in that a contact means becomes effective between the connection part and the associated end section of a tube section during the course of the plastic deformation. The contact means may be a mechanically acting means, which buries itself in the facing outer surface and/or inner surface by means of respective indentations or protruding ribs during the course of the plastic deformation. The contact means may additionally be a fluid, which produces or promotes the electric contact between the connection part and the associated tube section.

An oxidation layer particularly may form on the surface of aluminum tubes, in which case the associated connection parts may likewise consist of aluminum, wherein an electrical conductivity may be interrupted by this oxidation layer. During normal contact between the facing surfaces of the tube and the connection part, the arrangement of a contact means makes it possible to break through such an oxidation layer or to prevent its formation or to dissolve a formed oxidation layer to the extent required for realizing an uninterrupted electrical conductivity of the tube.

The tube sections and/or the connection part may also consist of a steel material, wherein the connection parts may also consist, e.g., of zinc. In this case, the same aspects as those described above with reference to aluminum apply with respect to possible phenomena or changes of these materials, which could potentially impair the electrical conductivity.

In a potential embodiment, the connection part may have a (first) receptacle recess for a sealing ring extending transverse to a longitudinal axis of the connection part and a sealing ring accommodated therein. The tube accommodating the electric lines or the tube assembled of tube sections and connection parts does not necessarily have to be tight with respect to an internal tightness. An internal overpressure generally does not exist. However, it is particularly desirable to prevent an admission of moisture, particularly in the form of water, from outside the tube. The moisture may be produced due to water condensation, a building water damage or rain water or running water if such a tube is installed on the outside of a building. In this context, the term "rain-tight" particularly is used in the US region, in which the use of such tubes with electric lines installed therein is preferred. The term "fluid-tight" is also used for an installation of such tubes, e.g., in concrete.

The sealing ring accommodated in the receptacle recess particularly acts in a sealing manner between the inner surface of the connection part and the associated outer surface of the tube section in the plastically deformed connected position of the connection part and the associated tube section. Viewed from outside, the sealing ring preferably is arranged in front of the contact means referred to a potential admission path of moisture or water, respectively.

It is furthermore preferred that the connection part may respectively have a (first) receptacle recess with a sealing ring accommodated therein in two regions that are spaced apart from one another in the longitudinal direction and respectively intended for receiving a tube end. A seal is accordingly produced in a preferred embodiment, in particular, in the connected position of the connection part with the two tube sections. In a potential embodiment, a fluid-tight zone is thereby formed between the two sealing rings with respect to the longitudinal direction of the connection part.

Viewed from the free end of the connection part, the contact means may therefore be formed or accommodated in the connection part beyond the sealing ring. According to a preferred embodiment, the contact means may accordingly be arranged "in the shadow" of the sealing ring, preferably in the region that is protected from moisture by the sealing ring.

Viewed from the respective free end of the connection part, the connection part may also respectively have a contact means beyond the sealing ring in two regions that are spaced apart from one another in the longitudinal direction. Viewed in the longitudinal direction of the connection part, both contact means are in such an embodiment accordingly arranged between the sealing regions and therefore in the region that is protected from fluid.

A contact means may also be formed by a claw part that is realized separately of the connection part and arranged on the inner side of the connection part. In this way, the claw part can be manufactured separately and assigned to the connection part. The claw part may also consist of another material than the connection part, optionally of a harder material. The claw part is suitable and designed for burying itself in the facing surface of the connection part and/or the tube section, particularly during the course of the plastic deformation of the connection part, and for accordingly producing an at least approximately form-fitting connection.

For example, the claw part may have claw projections on two sides that lie opposite of one another in the radial direction referred to the longitudinal axis of the connection part. The claw projections pointing radially outward may be suitable for burying themselves in the facing inner surface of the connection part whereas the claw projections pointing radially inward may preferably be designed for correspondingly burying themselves in the facing outer surface of the tube section. Accordingly, the electrically conductive connection between connection part and tube section is in the connected state additionally or exclusively produced by means of the claw part. This claw part is accordingly made of an electrically conductive material.

The claw part may also be realized in the form of a flat part that has an annular shape or the shape of a ring segment, wherein the claw projections protrude from said flat part, preferably radially outward and/or radially inward. In an annular design of the claw part, the claws may be uniformly arranged over the entire circumference of the claw part. However, only circumferential sections of a completely annular claw part may alternatively be provided with protruding claws. With the exception of the claws, the claw part may be realized with a rectangular cross section.

The connection part may optionally have a second receptacle recess for the claw part. However, the claw part may alternatively also be arranged in the same receptacle recess, in which the directly associated (upstream) sealing ring is also accommodated.

The contact means may also be formed by an indentation in the inner surface of the connection part. A design similar to a claw part may accordingly be provided directly on the connection part and point radially inward such that it can be engaged with the associated tube section in the connected position. The indentation in the inner surface results in protruding ribs or claws that can bury themselves in the facing outer surface of the tube section during the course of the compression. The ribs may be realized continuously in the circumferential direction. A plurality of claws may be formed adjacent to one another in the circumferential direction in uniform and orderly or disorderly distribution.

Such a design with indentations may alternatively or additionally also be provided on the outer side of the end sections of the tube sections in order to correspondingly interact with the inner surface of the connection part.

The protruding claws of the claw part or the claw-like projections resulting between the indentations, for example in the inner surface of the connection part, may extend strictly parallel to the longitudinal axis of the connection part and accordingly perpendicular to a circumferential line extending concentric to the connection part axis. These optionally rib-like claws or projections may alternatively also extend at an acute angle to the aforementioned circumferential line.

If the contact means is formed by indenting the inner surface of the connection part, the contact means is preferably realized integrally with the connection part and consists of the same material. Such an integral design also applies to a potential indentation in the outer surface of the tube section.

In an optional alternative embodiment, the contact means may be an electrically conductive contact fluid. The contact fluid can be introduced into the corresponding region immediately before the connection between the connection part and the tube section is produced. In this respect, a corresponding fluid reservoir also may already be provided in the stand-by position of the connection part.

The contact means may be realized on the basis of grease, e.g. in the form of a contact grease as it is known, for example, in connection with compressible cable lugs.

If the contact means is realized on the basis of a fluid, it may also contain solid fractions such as soot and/or carbon particles in order to achieve the conductivity or to improve the conductivity.

The connection part may have a cover element, e.g. in the form of a plug-type cap, in order to protect the fluidic contact means before the connection part is used, wherein said cover element can be removed prior to the use of the connection part and the corresponding insertion of an end section of a tube section.

The connection part may also have a stopping element that is formed beyond the contact means starting from a free end of the connection part and prevents the insertion of the tube section through the connection part. The insertion of the tube section is thereby limited by the stopping element, wherein the abutment on the stopping element ensures that the contact means can move into an electrically conductive position relative to the associated tube section during the course of the plastic deformation of the connection part.

The stopping element of the connection part can be used for the first tube section, as well as for the second tube section. In a potential embodiment, the stopping element may be formed by a bead that extends concentric to the longitudinal axis of the connection part and is directed radially inward, particularly in the form of a—viewed from outside—groove-shaped depression. The stopping element may also be formed by elevations that optionally are uniformly distributed over the circumference and, for example, directed radially inward, particularly elevations that have the shape of mushroom heads and are formed by correspondingly deforming the wall material of the connection part.

Alternatively or additionally to the stopping element, the connection part may also have an indicator element for indicating a complete insertion of an associated tube section into the connection part. The indicator element preferably is visible for the user from outside, optionally and preferably also after the connection part and the tube sections have been connected by plastic deformation. The indicator element may be respectively realized or arranged in such a way that the indicator element becomes visible or changes its shape and/or color and/or surface design upon the complete insertion of the associated tube section. In a preferred embodiment, the corresponding indication is only achieved once the associated tube section is completely inserted into a position that makes it possible to produce a proper connection. A stopping element for the tube section can be eliminated in this case. However, the indicator element may alternatively also be provided in addition to such a stopping element.

In a potential embodiment, the indicator element consists of a flexible material that is displaced radially outward due to the insertion of the tube section. For example, the flexible material may only be acted upon by a corresponding wall region of the tube section, e.g. the end section, in such a way that the flexible indicator element is displaced or at least partially displaced radially outward once the tube section has been completely inserted. For example, the flexible material may thereby become visible for the user from outside.

BRIEF DESCRIPTION OF THE DRAWINGS

The invention is described in greater detail below with reference to the attached drawings that, however, merely show an exemplary embodiment. A component, which is described with reference to one of the exemplary embodiments and not replaced with a different component in another exemplary embodiment, is therefore also described as a potentially existing component in this other exemplary embodiment. In the respective drawings:

FIG. 7 shows an enlarged detail of the region VII in FIG. 6;

FIG. 8 shows another embodiment in the form of an illustration corresponding to FIG. 3;

FIG. 9 shows the embodiment according to FIG. 8 after the connecting processes been carried out;

FIG. 10 shows an enlarged detail of the region X in FIG. 9;

FIG. 11 shows a detailed section through another embodiment of a connection part with an associated cover element;

FIG. 12 shows a detailed section according to FIG. 11 through another embodiment with an indicator element;

FIG. 13 shows an illustration corresponding to FIG. 12, however, after an associated tube section has been inserted into the connection element and thereby acted upon the indicator element; and FIG. 14 shows a longitudinal section through another embodiment of a connection part in the position, in which it is connected to a tube section.

DESCRIPTION OF THE EMBODIMENTS

Figure 1:
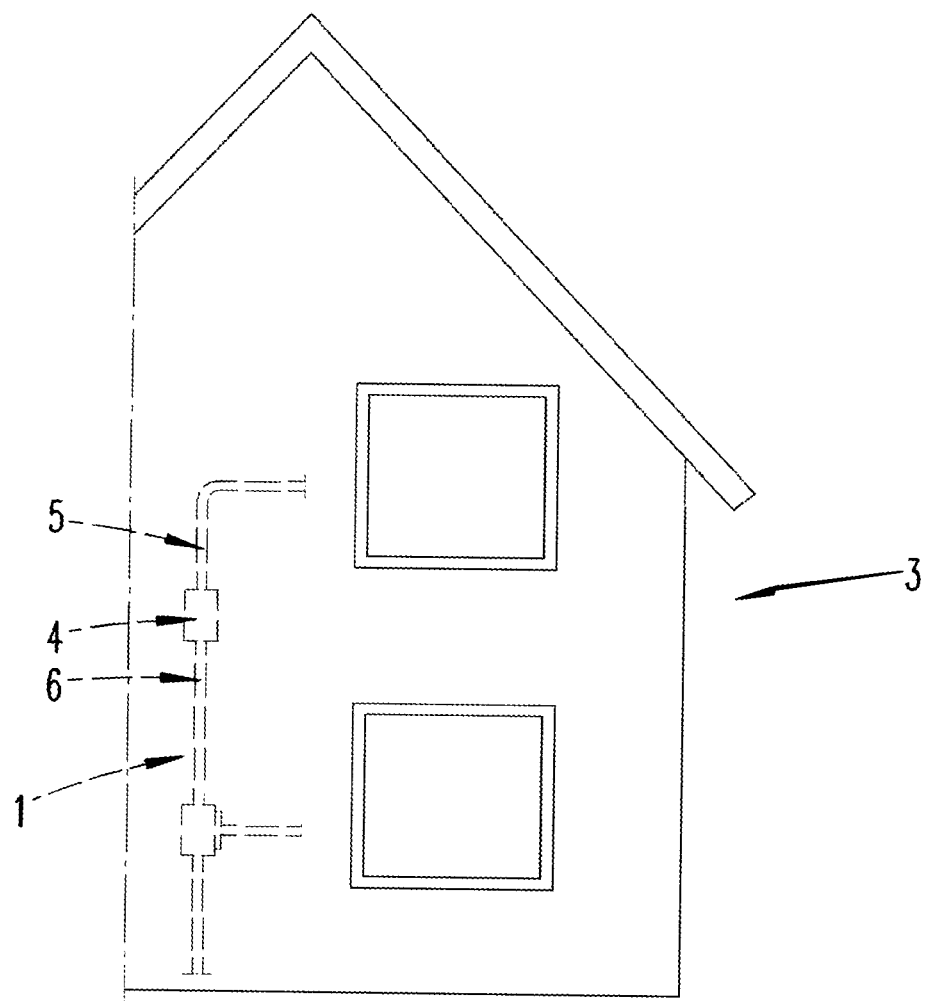
FIG. 1 schematically shows a building with a tube for accommodating an electric line.
Figure 2:
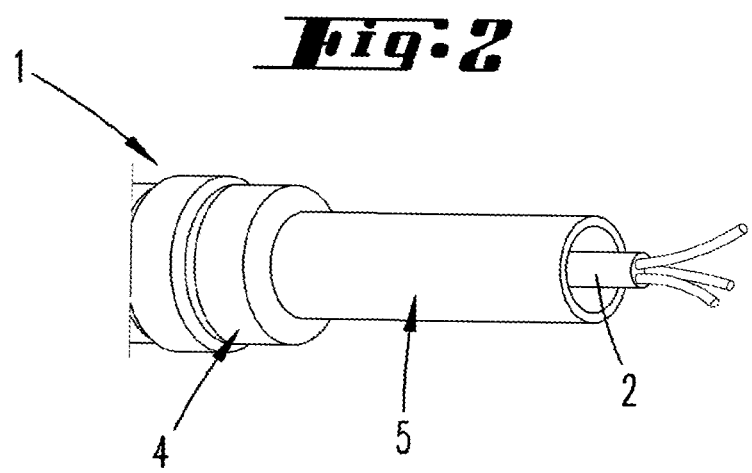
FIG. 2 shows a perspective detail of a tube with installed electric line.

A metallic, electrically conductive tube 1, which consists, e.g., of aluminum and serves for accommodating and installing an electric line 2 for the electrical power supply of a building 3, is initially described with reference to FIGS. 1 and 2. In FIG. 1, the tube is illustrated excessively large in relation to the building 3.

The tube 1 is essentially composed of tube sections 5 and 6 that are connected by means of tubular connection parts 4 in the extension direction of the tube 1. The connection part 4 is realized in a sleeve-like manner and designed for producing a mechanical connection, but particularly also an electrically conductive connection, with the tube sections 5 and 6 as a result of plastic deformation, particularly a compression.

A first end section 7 of a first tube section 5 that is inserted into the connection part 4 typically faces a second end section 8 of a second tube section 6, preferably with the same axial orientation along the longitudinal axis x defined by the tubular connection part 4.

The tubular connection part 4 shown has an inner surface that points radially inward and faces a first outer surface 10 of the first tube section 5 and a second outer surface 11 of the second tube section 6.

Figure 3:
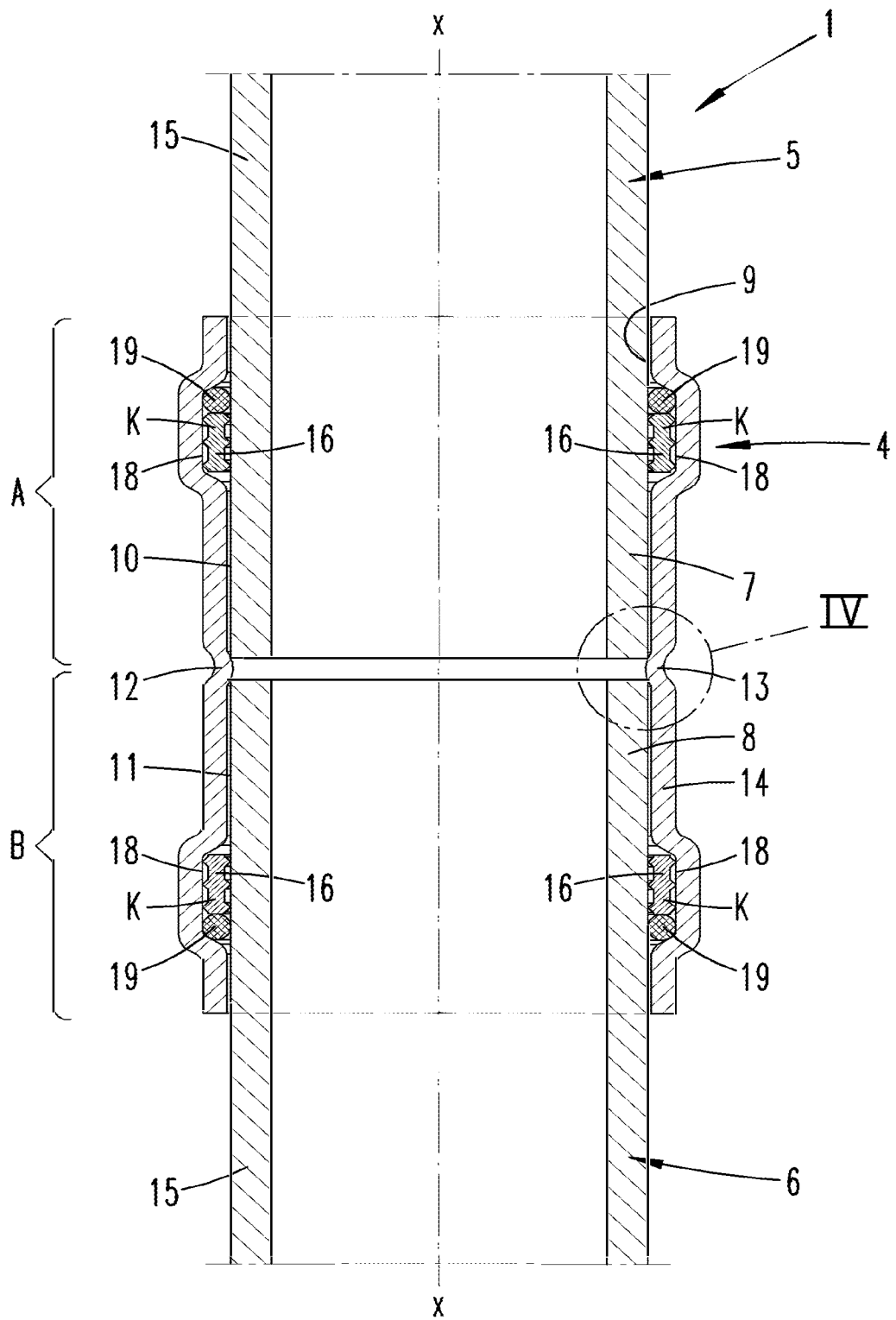
FIG. 3 shows a longitudinal section through a first embodiment of a connection part for connecting two tube sections prior to carrying out a connecting process.
Figure 4:
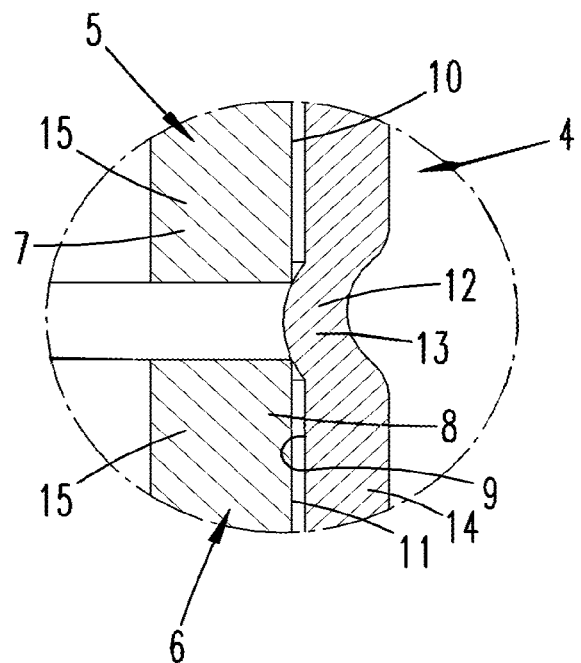
FIG. 4 shows an enlarged detail of the region IV in FIG. 3.

In the inserted state of the tube sections 5 and 6 into the connection part 4, e.g. according to the illustration in FIG. 3, a first overlapping section A is formed in the overlapping region between the inner surface 9 and the first outer surface 10 of the first tube section 5 and a second overlapping section B is formed in the overlapping region between the inner surface 9 of the connection part 4 and the second outer surface 11 of the second tube section 6.

The connection part 4 may have a stopping element 12 in order to respectively prevent an insertion of a tube section 5, 6 through the connection part 4 or to define a predetermined insertion position of a tube section 5 or 6 within the connection part 4. This stopping element may be formed centrally of the connection part 4 with respect to the extension of the longitudinal axis x as shown, e.g. and preferably as a result of the formation of a bead 13 that extends circumferentially with respect to the longitudinal axis x and protrudes radially inward over the inner surface 9. The bead 13 may be formed as a result of a corresponding deformation of the connection part wall 14.

The free end face of the respective end section 7 or 8 of the respective tube section 5 or 6 abuts on the bead 13 that protrudes radially inward such that its insertion is limited by the stopping element.

Figure 5:
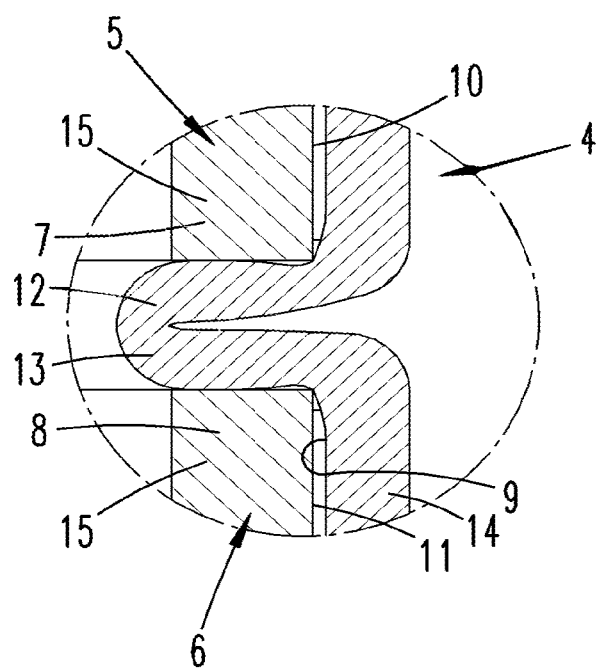
FIG. 5 shows an alternative embodiment in the form of an illustration corresponding to FIG. 4.
Figure 6:
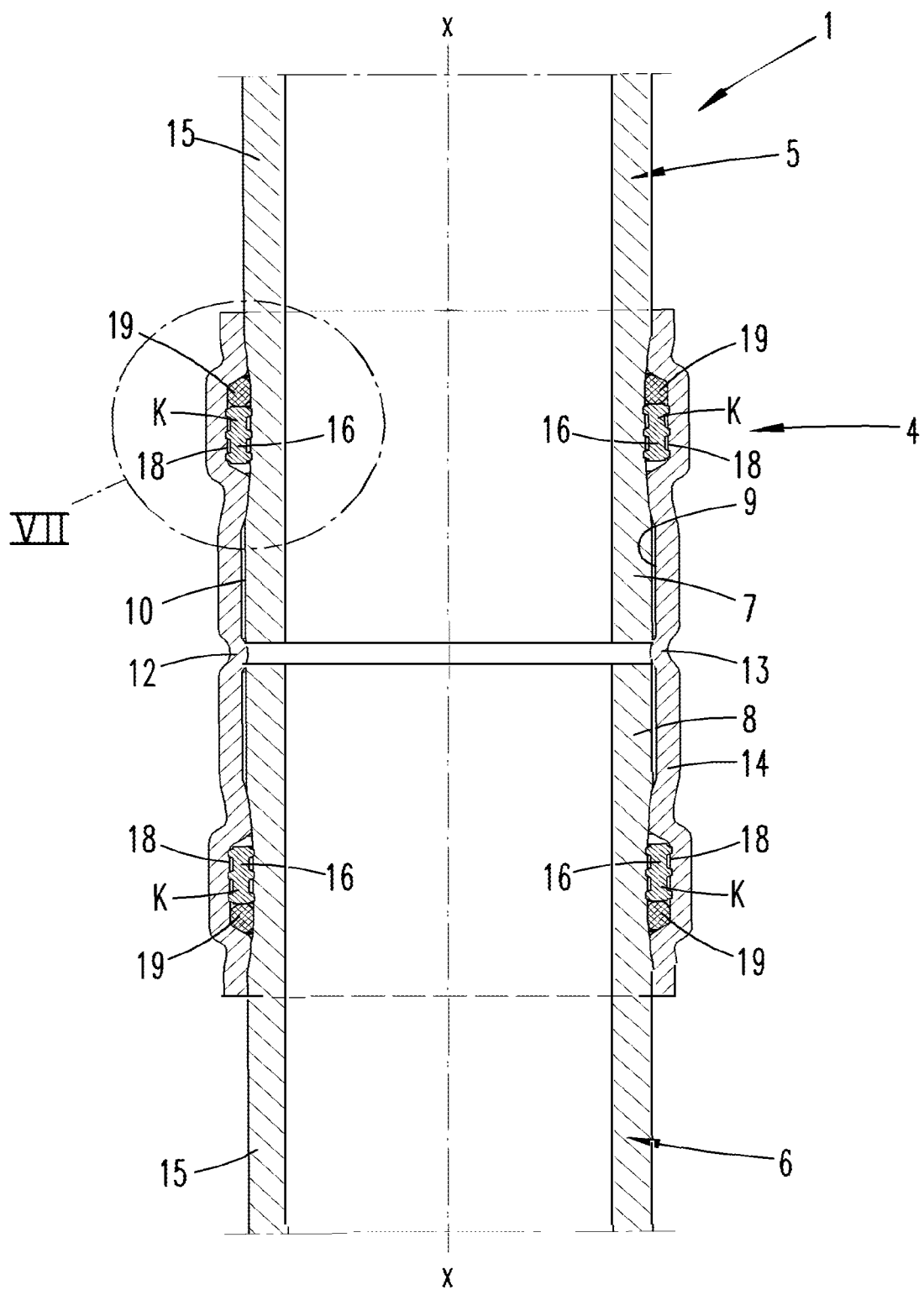
FIG. 6 shows an illustration corresponding to FIG. 3, however, after the connecting process has been carried out.

The detail according to FIG. 5 furthermore shows that the bead 13 may radially protrude from the inner surface 9 by a dimension that is chosen equal to or greater than the wall thickness of the tube section wall 15. An electric line 2 routed through a thusly designed connecting region is protected from damages by the potentially sharp-edged free outer edge of the tube section by the bead 13, which protrudes radially inward over this free outer edge.

The connection of the tube sections 5 and 6 is achieved as a result of plastic deformation of the connection part 4 in its first and second overlapping sections A and B and of the first and second tube sections 5 and 6 in the first and second end regions 7 and 8. This plastic deformation preferably is achieved, for example, as a result of a compression, e.g. by utilizing a preferably hydraulic pressing apparatus with correspondingly adapted pressing jaws.

A contact means K respectively becomes effective in the overlapping section A, as well as in the overlapping section B, during the course of the plastic deformation in order to produce or improve the electrical conductivity of the tube 1 as a whole, particularly in the region of the described connection.

The contact means K may be realized in the form of a claw part 16 that is realized separately of the connection part 4 and arranged on the inner side thereof as illustrated in the exemplary embodiment according to FIGS. 3 to 7. The claw part 16 is made of an electrically conductive material, particularly a metallic material such as steel.

The claw part 16 may furthermore be realized in the form of an altogether annular flat part, wherein claw projections 17 that protrude radially outward and radially inward are formed on said flat part. In the exemplary embodiment shown, three claw projections 17 extending in the circumferential direction of the claw part 16 are respectively provided on the radially outer side, as well as on the radially inner side. The claw projections 17 and the claw part 16 preferably are realized integrally and consist of the same material.

The claw part 16 or the contact means K formed thereby is respectively assigned to the overlapping section A and the overlapping section B and lies in a correspondingly positioned groove-like receptacle recess 18, which preferably extends circumferentially referred to the longitudinal axis x and preferably is only open toward the inner surface 9 of the connection part 4.

The receptacle recess 18 is formed at a distance from the associated free end of the connection part 4 referred to the extension of the longitudinal axis x.

The connection part 4 furthermore comprises two seals 19 that are respectively realized, in particular, in the form of a sealing ring of a thermoplastic material. Each sealing ring 19 extends transverse and therefore in the circumferential direction referred to the longitudinal axis x of the connection part 4 and is respectively associated with an insertion end of the connection part 4.

Each sealing ring 19 may be arranged in a separate receptacle recess of the connection part 4 or, as respectively illustrated, in the receptacle recess 18 that at the same time also accommodates the contact means K.

Viewed from the facing free end of the connection part 4, the contact means K according to the exemplary embodiments illustrated in FIGS. 1 to 13 preferably is respectively formed or accommodated in the connection part 4 beyond the directly associated sealing ring 19. Viewed in the extension direction of the connection part 4 along the longitudinal axis x, the contact means K for interacting with the tube sections 5 and 6 are accordingly arranged in a position, in which they are protected from fluid ingressing from outside by the sealing rings 19.

In the connected position, the sealing rings 19 respectively act against the first outer surface 10 of the first tube section 5 and against the second outer surface 11 of the second tube section 6 in a sealing manner.

During the course of the compression, the wall regions of the connection part 4 and of the tube sections 5 and 6, which are acted upon by the pressing tool, are plastically deformed in the overlapping sections A and B such that a mechanical connection, which preferably can no longer be separated in a non-destructive manner, is subsequently produced between the connection part 4 and the tube sections 5 and 6. After this plastic deformation, the sealing rings 19 are in a sealing position between the inner surface 9 of the connection part 4 in the region of the receptacle recess 18 and the directly facing outer surface 10 or 11 of the tube section 5 or 6.

The contact means K, i.e. the claw part 16 according to the first exemplary embodiment, is simultaneously subjected to a load during such a plastic deformation in such a way that the claw part 16 buries itself radially outward in the facing inner surface 9 of the connection part 4 and radially inward in the facing first or second outer surface 10, 11 of the first or the second tube section 5, 6 with its claw projections 17. A potentially existing oxidation layer on the outer surface 10, 11 and/or the inner surface 9 in the region of the receptacle recess 18 is overcome as a result of this burying action of the claw projections 17 such that the electrical conductivity of the connection is ensured (see FIG. 7).

An indentation is thereby produced in the inner surface 9 and/or the first and the second outer surface 10, 11.

According to the second exemplary embodiment illustrated in FIGS. 8 to 10, the contact means K may also be formed by an indentation 20 in the inner surface 9 of the connection part 4. Viewed from a free end of the connection part 4, this indentation 20 is also formed and arranged beyond the directly associated sealing ring 19 and therefore in the shadow of the sealing ring 19.

The indentation 20 may be formed by a groove-like depression that extends in the inner surface 9 circumferentially referred to the longitudinal axis x. Viewed in the extension direction of the longitudinal axis x, a plurality of indentations 20, for example up to five or ten or fifteen such circumferential indentations 20, may be respectively associated with an overlapping section A or B.

With respect to a longitudinal section through this region according to the enlarged detail in FIG. 10, the indentations 20 leave tooth-shaped projections that bury themselves in the respective facing outer surface 10 or 11 of the first or the second tube section 5, 6 during the course of the plastic deformation resulting from a compression or the like in order to thereby ensure the electrically conductive connection.

The dimensions of the indentations 20 or also of the claw projections 17 of the claw part 16, particularly with respect to their extension in the radial direction, are chosen such that they can approximately bury themselves by up to a third, preferably by up to a sixth or eighth, optionally by only up to a tenth or twentieth, of the thickness of the tube wall 15 viewed in the radial direction.

The contact means K may also be an electrically conductive contact fluid 21. The contact fluid may be realized, for example, on the basis of grease and optionally contain solid fractions such as soot and/or carbon particles in order to additionally improve the conductivity.

Such a contact fluid 21 may be arranged in the contact region in addition to the claw part 16 or the indentation 20.

The contact means K may alternatively also be formed by the contact fluid 21 only. According to the embodiment in FIG. 11, such a contact fluid 21 may be arranged in a correspondingly designed separate (second) receptacle recess 22. This receptacle recess 22 is with respect to the free end of the connection part 4 formed beyond the directly associated sealing ring 19 and the receptacle recess 18 accommodating this sealing ring 19.

A plug-like cover element 23, which penetrates into the interior from the free end of the connection part 4, is provided prior to the use of the connection part 4 and protects the contact fluid 21 accommodated in the receptacle recess 22 from drying out and/or escaping.

Once the cover element 23 has been removed and an associated tube section 5 or 6 has been inserted, the receptacle opening 22 with the contact fluid 21 contained therein is exposed radially inward in order to contact the facing outer surface 10, 11, particularly after the compression has been carried out.

According to the illustration in FIG. 14, the contact means K may also be the outer edge 24 on the free end of the connection part 4, wherein said outer edge 24 at the same time defines the associated receptacle recess 18 for the sealing ring 19. The outer edge 24 points radially inward and is pressed into the respective facing outer surface 10 or 11 of the respective tube section 5 or 6 during the course of the plastic deformation for producing the connection, particularly such that the outer edge 24 at least partially buries itself in the tube wall 15.

The connection part 4 may have an indicator element 25 alternatively or additionally to a stopping element 12. According to the example illustrated in FIGS. 12 and 13, this indicator element may be realized in the form of an element that consists of a flexible material, e.g. a rubber material.

The indicator element 25 is respectively arranged on or in the connection part 4 in such a way that it can serve for indicating a properly inserted tube section 5, 6.

For example, the indicator element 25 may be arranged in an opening 26 in the wall 14 of the connection part as shown such that it fills out this opening completely and preferably in a sealing manner.

In the embodiment shown, the indicator element 25 is in the no-load state according to the illustration in FIG. 12 realized such that it bulges radially inward beyond the inner surface 9 of the connection part 4. The bulge points radially inward and manifests itself radially outward such that it is visible for the user in the form of a corresponding depression 28 within the opening 26. Viewed from the associated free end of the connection part 4, the indicator element 25 is arranged beyond the associated sealing ring 19, as well as beyond the associated contact means K, and accordingly beyond the indentations 20 in the illustrations in FIGS. 12 and 13.

The indicator element 25 is accordingly arranged in a region that lies behind the sealing means and the contact means referred to the extension direction of the tube section 5 or 6 into the connection part 4.

When the respective tube section 5 or 6 is inserted into the connection part 4, the corresponding end section 7 or 8 acts upon the bulge 27 of the indicator element 25 in the region of the corresponding outer surface 10 or 11 once the predetermined insertion depth is reached such that the indicator element 25 is displaced radially outward (see FIG. 13). The originally visible depression 28 is thereby subjected to a significant change that can be perceived optically, as well as haptically. The depression 28 is not pronounced as deep as in the no-load position in FIG. 12, wherein the radial displacement of the indicator element 25 toward the outside can also lead to the indicator element 25 being aligned radially outward with the surrounding surface of the connection part wall 14 or even protruding over this surrounding surface, e.g. in a dome-like manner.

In addition to the sleeve shape shown, the connection part 4 may also be realized in accordance with all other conventional tube connector designs, e.g. in the form of an arc-shaped connector or in the form of a T-shaped connector, wherein each connecting region for receiving a tube section preferably is realized in accordance with the above-described characteristics.

The preceding explanations serve for elucidating all inventions that are included in this application and respectively enhance the prior art independently with at least the following combinations of characteristics, wherein two, more or all of these combinations of characteristics may also be combined, namely:

A building, which is characterized in that the tube is composed of multiple tube sections, which are connected to one another by means of a tubular connection part in an extension direction of the tube, wherein the connection part is electrically conductive and metallic, wherein a first tube section of the connected tube sections has a first end section and a second tube section of the connected tube sections has a second end section and the first end section and the second end section face one another, wherein the first tube section has a first outer surface, the second tube section has a second outer surface and the connection part has an inner surface, wherein the connection part extends with its inner surface facing the first and the second outer surface and overlapping the first and the second outer surface in a first and a second overlapping section, wherein the connection of the tube sections 5, 6 is achieved as a result of plastic deformation of the connection part 4 in the first and the second overlapping section A, B and of the first and the second tube section 5, 6 in the first end section 7 and in the second end section 8, and wherein a contact means K is respectively effective in the first and the second overlapping section A, B between the inner surface 9 and the first and the second outer surface 10, 11, with said contact means ensuring the electrically conductive connection between the first end section 7 and the connection part 4 and between the connection part 4 and the second end section 8 by means of an indentation in the inner surface 9 or the first and the second outer surface 10, 11 or by means of fluidic contact between the first and the second outer surface 10, 11 and the inner surface 9.

An electric line, which is characterized in that the tube is composed of multiple tube sections, which are connected to one another by means of a tubular connection part in an extension direction of the tube, wherein the connection part is electrically conductive and metallic, wherein a first tube section of the connected tube sections has a first end section and a second tube section of the connected tube sections has a second end section and the first end section and the second end section face one another, wherein the first tube section has a first outer surface, the second tube section has a second outer surface and the connection part has an inner surface, wherein the connection part extends with its inner surface facing the first and the second outer surface and overlapping the first and the second outer surface in a first and a second overlapping section, wherein the connection of the tube sections 5, 6 is achieved as a result of plastic deformation of the connection part 4 in the first and the second overlapping section A, B and of the first and the second tube section 5, 6 in the first end section 7 and in the second end section 8, and wherein a contact means K is respectively effective in the first and the second overlapping section A, B between the inner surface 9 and the first and the second outer surface 10, 11, with said contact means ensuring the electrically conductive connection between the first end section 7 and the connection part 4 and between the connection part 4 and the second end section 8 by means of an indentation in the inner surface 9 or the first and the second outer surface 10, 11 or by means of fluidic contact between the first and the second outer surface 10, 11 and the inner surface 9.

A tube, which is characterized in that the tube is composed of multiple tube sections, which are connected to one another by means of a tubular connection part in an extension direction of the tube, wherein the connection part is electrically conductive and metallic, wherein a first tube section of the connected tube sections has a first end section and a second tube section of the connected tube sections has a second end section and the first end section and the second end section face one another, wherein the first tube section has a first outer surface, the second tube section has a second outer surface and the connection part has an inner surface, wherein the connection part extends with its inner surface facing the first and the second outer surface and overlapping the first and the second outer surface in a first and a second overlapping section, wherein the connection of the tube sections 5, 6 is achieved as a result of plastic deformation of the connection part 4 in the first and the second overlapping section A, B and of the first and the second tube section 5, 6 in the first end section 7 and in the second end section 8, and wherein a contact means K is respectively effective in the first and the second overlapping section A, B between the inner surface 9 and the first and the second outer surface 10, 11, with said contact means ensuring the electrically conductive connection between the first end section 7 and the connection part 4 and between the connection part 4 and the second end section 8 by means of an indentation in the inner surface 9 or the first and the second outer surface 10, 11 or by means of fluidic contact between the first and the second outer surface 10, 11 and the inner surface 9.

A building, an electric line and a tube, which are characterized in that the connection part 4 has a (first) receptacle recess 18 for a sealing ring 19 extending transverse to a longitudinal axis x of the connection part 4 and a sealing ring 19 accommodated therein.

A building, an electric line and a tube, which are characterized in that the connection part 4 respectively has a (first) receptacle recess 18 with a sealing ring 19 accommodated therein in two regions that are spaced apart from one another in the longitudinal direction and respectively intended for receiving a tube end.

A building, an electric line and a tube, which are characterized in that the contact means K is formed or accommodated in the connection part 4 beyond the sealing ring 19 viewed from the free end of the connection part 4.

A building, an electric line and a tube, which are characterized in that the connection part 4 respectively has, viewed from the respective free end of the connection part 4, a contact means K beyond the sealing ring 19 in two regions that are spaced apart from one another in the longitudinal direction.

A building, an electric line and a tube, which are characterized in that the contact means K is formed by a claw part 16 that is realized separately of the connection part 4 and arranged on the inner side of the connection part 4.

A building, an electric line and a tube, which are characterized in that the claw part 16 has claw projections 17 on two sides that lie opposite of one another in the radial direction referred to the longitudinal axis x of the connection part 4.

A building, an electric line and a tube, which are characterized in that the claw part 16 is realized in the form of a flat part that has an annular shape or the shape of a ring segment, wherein the claw projections 17 protrude from said flat part.

A building, an electric line and a tube, which are characterized in that the connection part 4 has an (optionally second) receptacle recess 22 for the claw part 16.

A building, an electric line and a tube, which are characterized in that the claw part 16 lies in the (optionally first) receptacle recess 18 together with the sealing ring 19.

A building, an electric line and a tube, which are characterized in that the contact means K is formed by an indentation 20 in the inner surface 9 of the connection part 4.

A building, an electric line and a tube, which are characterized in that the contact means K is realized integrally with the connection part 4 and consists of the same material.

A building, an electric line and a tube, which are characterized in that the contact means K is realized in the form of an electrically conductive contact fluid 21.

A building, an electric line and a tube, which are characterized in that the contact means K is realized on the basis of grease.

A building, an electric line and a tube, which are characterized in that the contact means K contains solid fractions such as soot and/or carbon particles in order to achieve the conductivity.

A building, an electric line and a tube, which are characterized in that the connection part 4 has prior to its use a cover element 23 for protecting the fluidic contact means 21.

A building, an electric line and a tube, which are characterized in that the connection part 4 has a stopping element 12, which is formed beyond the contact means K starting from a free end of the connection part 4 and prevents the insertion of the tube section 5, 6 through the connection part 4.

A building, an electric line and a tube, which are characterized in that the connection part 4 has an indicator element 25 for indicating a complete insertion of an associated tube section 5, 6 into the connection part 4.

A building, an electric line and a tube, which are characterized in that the indicator element 25 consists of a flexible material that is displaced radially outward due to the insertion of the tube section 5, 6.

All disclosed characteristics are essential to the invention (individually, but also in combination with one another). The disclosure content of the associated/attached priority documents (copy of the priority application) is hereby fully incorporated into the disclosure of this application, namely also for the purpose of integrating characteristics of these documents into claims of the present application. The characteristics of the dependent claims also characterize independent inventive enhancements of the prior art without the characteristics of a claim, to which these dependent claims refer, particularly for submitting divisional applications on the basis of these claims. The invention specified in each claim may additionally comprise one or more of the characteristics cited in the preceding description, particularly characteristics that are provided with reference symbols and/or cited in the list of reference symbols. The invention also concerns designs, in which individual characteristics cited in the preceding description are not realized, particularly if they are obviously dispensable for the respective intended use or can be replaced with other means that have the same technical effect.

LIST OF REFERENCE SYMBOLS

1 Tube
2 Electric line
3 Building
4 Connection part
5 Tube section
6 Tube section
7 End section
8 End section
9 Inner surface
10 First outer surface
11 Second outer surface
12 Stopping element
13 Bead
14 Connection part wall
15 Tube section wall
16 Claw part
17 Claw projection
18 Receptacle recess
19 Sealing ring
20 Indentation
21 Contact fluid
22 Receptacle recess
23 Cover element
24 Outer edge
25 Indicator element
26 Opening
27 Protruding bulge
28 Depression
x Longitudinal axis
A Overlapping section
B Overlapping section
K Contact means

I claim:

1. A metallic, electrically conductive tube configured to install electric lines for an electrical power supply of a building in the tube, comprising:
   an electrically conductive and metallic tubular connection part having a continuous inner surface, a first plurality of indentations integrally formed in the inner surface, and a second plurality of indentations integrally formed in the inner surface, the first plurality of indentations being spaced from the second plurality of indentations;
   first and second electrically conductive and metallic tube sections which are connected to one another by the tubular connection part in an extension direction of the tube, the first tube section having first and second opposite ends, a first outer surface, and a first end section at the first end thereof, the second tube section having first and second opposite ends, a second outer surface and a second end section at the second end thereof, the first end section and the second end section facing one another, wherein the inner surface of the connection part faces and abuts against the first outer surface along a first overlapping section, the inner surface of the connection part faces and abuts against the second outer surface along a second overlapping section;
   the first plurality of indentations of the connection part being provided in the first overlapping section, wherein an electrically conductive connection between the first end section and the connection part is provided by compression and plastic deformation of the connection part in the first overlapping section along the first plurality of indentations and of the first tube section in the first end section, in which they adjoin one another directly and in a plastically deformed manner in a compressed state; and
   the second plurality of indentations of the connection part being provided in the second overlapping section, wherein an electrically conductive connection between the second end section and the connection part is provided by compression and plastic deformation of the connection part in the second overlapping section along the second plurality of indentations and of the second tube section in the second end section, in which they adjoin one another directly and in a plastically deformed manner in a compressed state.

2. The tube according of claim 1, in combination with a building, wherein electric lines for the electrical power supply of the building are installed in the tube.

3. The tube according to claim 1, in combination with electric lines that provide electrical power supply of a building.

4. A metallic, electrically conductive tube configured to install electric lines for an electrical power supply of a building in the tube, comprising:
   an electrically conductive and metallic tubular connection part having an inner surface;
   first and second electrically conductive and metallic tube sections which are connected to one another by the tubular connection part in an extension direction of the tube, the first tube section having first and second opposite ends, a first outer surface, and a first end section at the first end thereof, the second tube section having first and second opposite ends, a second outer surface and a second end section at the second end thereof, the first end section and the second end section facing one another, wherein the inner surface of the connection part faces the first outer surface and overlaps the first outer surface in a first overlapping section, the inner surface of the connection part faces the second outer surface and overlaps the second outer surface in a second overlapping section, the connection part overlaps the first end of the first tube section and overlaps the second end of the second tube section, wherein connection of the tube sections is provided by compression and plastic deformation of the connection part in the first and second overlapping sections and of the first and second tube sections in the first and second end sections, in which they adjoin one another directly and in a plastically deformed manner in a compressed state;

a first contact providing an indentation in the inner surface and/or in the first outer surface in the first overlapping section to form an electrically conductive connection between the first end section and the connection part when in the compressed state;

a second contact providing an indentation in the inner surface and/or the second outer surface in the second overlapping section to form an electrically conductive connection between the second end section and the connection part when in the compressed state; and an electrically conductive contact fluid between the tubular connection part and the first and second tube sections.

5. The tube according to claim 4, wherein the contact fluid is formed by grease.

6. The tube according to claim 4, wherein the contact fluid contains solid fractions such as soot and/or carbon particles in order to achieve the conductivity.

7. The tube according to claim 4, wherein prior to connection of the connection part with the first and second tube sections, the connection part has a cover element attached thereto for protecting the contact fluid.

8. The tube according of claim 4, in combination with a building, wherein electric lines for the electrical power supply of the building are installed in the tube.

9. The tube according to claim 4, in combination with electric lines that provide electrical power supply of a building.

10. The tube according to claim 1, wherein each first indentation extends circumferentially along the inner surface of the connection part, and each second indentation extends circumferentially along the inner surface of the connection part.

* * * * *